(12) United States Patent
Cooper

(10) Patent No.: US 9,976,605 B2
(45) Date of Patent: May 22, 2018

(54) DUAL RAMP ACTUATOR CONTROLLING A TWO CLUTCH SYSTEM FOR A DRIVELINE

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 296 days.

(21) Appl. No.: 14/978,918

(22) Filed: Dec. 22, 2015

(65) Prior Publication Data
US 2017/0175823 A1    Jun. 22, 2017

(51) Int. Cl.
| F16D 23/12 | (2006.01) |
| F16D 21/06 | (2006.01) |
| F16D 13/38 | (2006.01) |
| F16D 121/14 | (2012.01) |
| F16D 125/46 | (2012.01) |

(52) U.S. Cl.
CPC ........... *F16D 23/12* (2013.01); *F16D 13/385* (2013.01); *F16D 21/06* (2013.01); *F16D 2023/123* (2013.01); *F16D 2121/14* (2013.01); *F16D 2125/46* (2013.01)

(58) Field of Classification Search
CPC .... F16D 23/12; F16D 13/385; F16D 2125/46; F16D 2023/123; F16D 2121/14; F16D 21/00–21/04; F16D 27/115
See application file for complete search history.

(56) References Cited

U.S. PATENT DOCUMENTS

| 3,791,501 A | * | 2/1974 | Culbertson | ............. | F16D 23/12 |
| | | | | | 192/93 A |
| 5,078,249 A | | 1/1992 | Botterill | | |
| 5,106,349 A | | 4/1992 | Botterill et al. | | |

(Continued)

FOREIGN PATENT DOCUMENTS

| DE | 102007014831 A1 | 7/2007 |
| WO | 2007034208 A1 | 3/2007 |

OTHER PUBLICATIONS

Machine-generated English translation of DE102007014831, obtained via Espacenet Patent Search.

(Continued)

*Primary Examiner* — Ramya P Burgess
*Assistant Examiner* — Lillian T Nguyen
(74) *Attorney, Agent, or Firm* — Marshall & Melhorn, LLC

(57) ABSTRACT

A ball ramp actuator assembly including a control ring, an activation ring including a first section and a second section, two circumferential plate grooves formed between the control ring and the sections of the activation ring which contain rolling elements, two clutches, a gear and an actuator. The first and second sections are splined together allowing for axial movement. The first clutch is connected to the first section of the activation ring and a second clutch is connected to the second section of the activation ring. The rotation of a section of the activation ring axially in one direction allows the corresponding plate groove to expand and apply a load to the corresponding clutch while the other section of the activation ring remains inactive and rotation in the opposite direction activates the other clutch respectively.

14 Claims, 2 Drawing Sheets

(56) References Cited

U.S. PATENT DOCUMENTS

| | | | |
|---|---|---|---|
| 5,485,904 A * | 1/1996 | Organek | F16D 23/12 |
| | | | 192/35 |
| 5,651,437 A | 7/1997 | Organek et al. | |
| RE36,502 E | 1/2000 | Organek et al. | |
| 6,019,694 A | 2/2000 | Forrest et al. | |
| 6,460,677 B1 | 10/2002 | Roscoe | |
| 6,758,782 B2 | 7/2004 | Matzschker et al. | |
| 6,827,663 B2 | 12/2004 | Tucker-Peake | |
| 6,966,864 B2 * | 11/2005 | Williams | B60K 17/3465 |
| | | | 180/248 |
| 9,033,126 B2 | 5/2015 | Strong | |
| 2009/0107794 A1 | 4/2009 | Einboeck | |
| 2010/0219034 A1 | 9/2010 | Wheals et al. | |
| 2014/0124320 A1 * | 5/2014 | Cooper | F16D 13/54 |
| | | | 192/20 |
| 2015/0211619 A1 * | 7/2015 | Cooper | F16H 48/08 |
| | | | 475/231 |
| 2016/0193915 A1 * | 7/2016 | Cooper | B60K 17/348 |
| | | | 475/220 |
| 2017/0211675 A1 * | 7/2017 | Cooper | F16H 48/36 |

OTHER PUBLICATIONS

Extended European Search Report of Application No. 16205565.1 (dated May 22, 2017).

* cited by examiner

DUAL RAMP ACTUATOR CONTROLLING A TWO CLUTCH SYSTEM FOR A DRIVELINE

FIELD OF THE INVENTION

The present invention relates to an assembly for controlling a two clutch system of a driveline using a dual ball ramp mechanism and a single actuator. The system allows for torque vectoring using a single dual ball ramp mechanism and one actuator.

BACKGROUND OF THE INVENTION

The use of ball ramp actuators powered by individual motors to load clutch packs in vehicle driveline differentials are well known. The advantage of the ball ramp actuator over other actuators is that it converts rotary motion into axial motion with high force implication. Ball ramp actuator assemblies include a control ring and an activation ring disposed thereon. Both the control and activation rings use opposing variable depth grooves to capture a rolling element for axially expanding and contracting the rings depending on the rotational direction of the activation ring relative to the control ring. The rotary motion of the activation ring is supplied by a motor. To generate an axial force, the activation ring rotates relative to the fixed control ring thereby causing the rolling elements to travel along the grooves of the corresponding rings to push the activation ring in an axial direction. A clutch may be connected to the activation ring such that the axial movement of the activation ring compresses the clutch plates so that they rotate together.

The use of a single motor actuator to rotate a single ball ramp mechanism to control a single clutch results in a complicated system of mechanical and electrical components. If there is more than one clutch, the prior art uses a separate motor actuator and ball ramp assembly for each clutch, further adding to the complication and expense of the system associated with the additional components.

SUMMARY OF THE INVENTION

The invention provides for a ball ramp actuator assembly including a control ring, an activation ring including a first section and a second section, two circumferential plate grooves formed between the control ring and the sections of the activation ring, a plurality of rolling elements interposed in the circumferential plate grooves, a gear and an actuator. The first and second sections of the activation ring are splined together to allow for axial movement. The gear is drivingly connected to the activation ring and the actuator is drivingly connected to the gear. A first clutch is connected to the first section of the activation ring and a second clutch is connected to the second section of the activation ring. The first section of the activation ring rotates axially when the gear moves in a first rotary direction, allowing the first circumferential plate groove to expand applying a load to the first clutch and the second section of the activation ring to remain stationary. The second section of the activation ring rotates axially when the gear moves in a second rotary direction, opposite the first rotary direction, allowing the second circumferential plate groove to expand applying a load to the second clutch and the first section of the activation ring to remain stationary.

The ball ramp actuator assembly allows for control of two clutches using one ball ramp mechanism and one actuator wherein the pair of clutches cannot be actuated at the same time.

In addition, the invention provides for a ball ramp mechanism where the circumferential plate grooves include multiple sections and each section has a different gradient to provide a different rate of axial displacement of the activation ring. The circumferential plate grooves can further include a section where the gradient of the two ramps allows for the control ring and activation ring be at a minimum axial distance from each other, i.e. a neutral position, and allows the rolling element to remain in the section if there is no rotation of the activation ring.

The invention is suitable for various applications, for instance, it can be used in a differential vehicle driveline to achieve variable distribution of torque between to side shafts.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
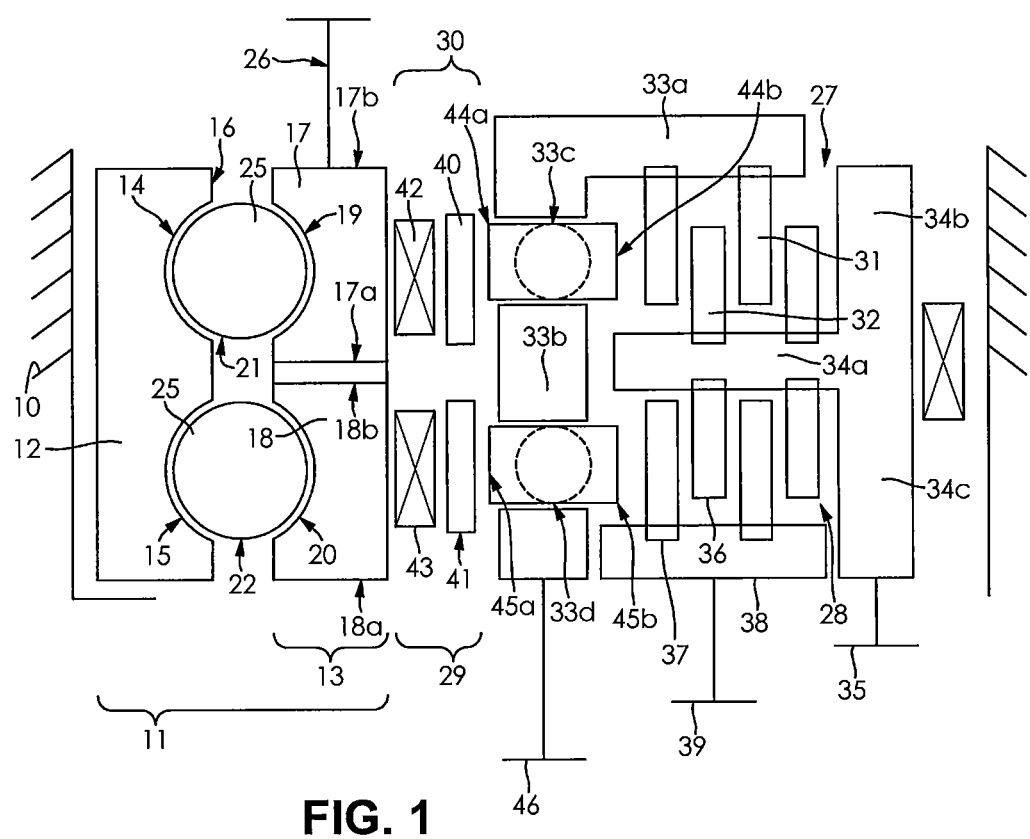
FIG. 1 is a diagrammatic view of the ball ramp actuator assembly in accordance with a preferred embodiment of the invention.

Referring now to FIG. 1 of the drawings, one embodiment of a ball ramp actuator assembly for actuating a clutch assembly is provided.

A non-rotatable housing 10 supports a ball ramp mechanism 11. The ball ramp mechanism 11 comprises a control ring 12 and an activation ring 13. Control ring 12 is held in a fixed position relative to housing 10 and activation ring 13. Control ring 12 has two, single direction, variable depth grooves 14, 15 located on the outer surface 16 opposing the housing 10. Control ring 12 may be such as a unitary, one-piece integrally formed plate.

Activation ring 13 is comprised of two sections, a first section 17 and a second section 18. The first section 17 is located directly radially outward from the second section 18 so that the first section 17 is concentric with the second section 18. The first section 17 has a radially inner surface 17a and a radially outer surface 17b. The radially inner surface 17a preferably has a set of integrally formed, unitary and one-piece splines.

The second section 18 has a radially inner surface 18a and a radially outer surface 18b. The radially outer surface 18b preferably has a set of integrally formed, unitary and one-piece splines. The second section 18 splines and the first section 17 splines are directly engaged with one another to permit the first section 17 and the second section 18 to move axially with respect to one another.

Each section of the activation ring 17, 18 has a single, direction variable depth groove 19, 20 on the surface thereof which at least partially opposes the groove 14, 15 in control ring 12 resulting in a matched pair of grooves between control ring 12 and activation ring 13. The grooves 14, 15, 19, 20 form corresponding ball ramps 21, 22 and each ball ramp contains at least one rolling element 25. Rolling element 25 as shown in FIG. 1 is a ball, particularly a thrust ball; however, the rolling elements may have other shapes.

Activation ring 13 is drivingly connected to a gear 26. Gear 26 is drivingly connected to an actuator (not shown). In one embodiment, gear 26 is directly connected to the first section 17 of activation ring. In another embodiment, gear 26 can be the last member of a gear train driven by the actuator. The gear train transfers a high speed, low torque output from the actuator and converts it to a low speed, high torque output which drives the first section 17 of activation ring.

The actuator can be an electric motor with a set or sets of speed reduction gears. In one embodiment, the motor is a brushed electric motor. In another embodiment, the motor is a brushless electric motor. The actuator and gear 26 rotate activation ring 13 relative to control ring 12.

When a section 17, 18 of the activation ring and the control ring 12 are rotated with respect to one another, rolling element 25 moves within ball ramp 21, 22, causing section 17, 18 of the activation ring and control ring 12 to become spaced apart dependent on the depth of the groove of the ball ramp 21, 22 where the rolling element 25 is positioned.

Two concentric clutches 27, 28 are connected to activation ring sections 17, 18, respectively. An inner clutch 28 is connected to the second section 18 of the activation ring via a thrust bearing assembly 29 and an outer clutch 27 is connected to the first section 17 of the activation ring via a thrust bearing assembly 30.

Outer clutch 27 includes a first set of clutch plates 31 which extend radially inward, a second set of clutch plates 32 which extend radially outward, wherein the first and second set of clutch plates 31, 32 are interleaved. Clutch plates 31 are attached to a first clutch hub 33. As shown in FIG. 1, the first clutch hub may be L-shaped, but the hub is not limited to this shape. The first clutch hub 33 may be comprised of an axial portion 33a and a radial portion 33b. The first set of clutch plates 31 are attached to the axial portion 33a for axial movement with respect to the axial portion 33a. The first clutch hub 33 is connected to an output shaft 46.

The second set of clutch plates 32 are mounted for axial movement with respect to a second clutch hub 34. In the depicted embodiment, the second clutch hub 34 may be T-shaped. The T-shape may be comprised of an axial member 34a, a first radial member 34b and a second radial member 34c. The first and second radial members 34b, 34c are axially aligned with one another. The second set of clutch plates 32 are preferably mounted on the axial member 34a. The first and second radially members 34b, 34c are unitary, one-piece and integrally formed with the axial member 34a.

First and second radial members 34b, 34c of the second clutch hub are connected to an input shaft 35 to receive rotation therefrom. The second clutch hub 34 may be connected to the input shaft 35 on an outer portion of one of the radial members 34b, 34c. Axial member 34a rotates with radial members 34b, 34c, which rotate the second set of clutch plates 32.

Clutch plates 31, 32 form the clutch pack for outer clutch 27. The axial member 33a of the first clutch hub, the radial member 33b of the first clutch hub and the axial member 34a of the second clutch hub form a clutch housing for the clutch pack of outer clutch 27.

Inner clutch 28 includes a first set of clutch plates 36 which extend radially inward, a second set of clutch plates 37 which extend radially outward, wherein the first and second set of clutch plates 36, 37 are interleaved. The second set of clutch plates 37 are attached to third clutch hub 38. The third clutch hub 38 has a radially outer surface from which clutches plates 37 extend radially outward. The first set of clutch plates 36 extend radially inward from an axially inward outer surface of axial portion of 34a. The first set of clutch plates 36 are attached to the axial portion 34a for axial movement with respect to the axial portion. Third clutch hub 38 is connected to an input shaft 39 to receive rotation therefrom.

Clutch plates 36, 37 form the clutch pack for inner clutch 28. The third clutch hub 38, the radial member 33b of the first clutch hub and the axial member 34a of the second clutch hub form a clutch housing for the clutch pack of inner clutch 28.

Each of set of clutch plates can contain clutch plates known in the art. As shown in FIG. 1, inner clutch 28 and outer clutch 27 include four clutch plates; however, it is understood that any number of plates may form the inner clutch or outer clutch The thrust bearing assemblies 29, 30 are interposed between activation ring sections 17, 18. The thrust bearing assembly includes two thrust plates 40, 41 and two thrust bearings 42, 43. Each thrust bearing 42, 43 is located between each section 17, 18 of the activation ring 13 and a thrust plate 40, 41. Each thrust plate 40, 41 is disposed between a thrust bearing 42, 43 and a clutch 27, 28. When the movement of the activation ring 13 creates an axial force, the force is transmitted to a clutch 27, 28 through the thrust bearing 42, 43, the thrust plate 40, 41 and a pin 44a, 45a. The thrust bearing 42, 43 facilitates relative rotation between the activation ring 13 and the thrust plate 40, 41 while axial force is applied therebetween. Thrust plate 40, 41 engages clutch 27, 28 to vary the frictional engagement.

The radial portion 33b of the first clutch hub may have an aperture for receiving a plurality of circumferentially spaced pins. In the embodiment depicted in FIG. 1, two thrust pins 44, 45 are located in two apertures 33c, 33d in radial portion 33b.

The first thrust pin 44 has a first terminal end 44a and a second terminal end 44b The first terminal end 44a of first thrust pin is in direct axial contact with thrust plate 40 and the second terminal end 44b extends through the apertures of the radial portion 33b.

The second thrust pin 45 has a first terminal end 45a and a second terminal end 45b. The first terminal end 45b of second thrust pin is in direct axial contact with thrust plate 41 and the second terminal end 45b extends through the apertures of the radial portion 33b. Thrust pins 44, 45 allow the movement of the activation ring 13 to transfer to the first clutch hub 33.

Springs (not shown) are located within each clutch 27, 28 to provide a small preload to thrust bearings 42, 43 and ball ramps 21, 22.

The assembly is arranged for controlling the actuation of the each clutch independently of the other clutch.

When gear 26 rotates in a first rotary direction, first section 17 of the activation ring moves with respect to control ring 12, first section 17 of the activation ring and control ring 12 become spaced apart and ball ramp 21 expands while ball ramp 22 remains inactive. The rotary motion causes one or more rolling elements 25 to traverse ball ramp 21. When ball ramp 21 expands, an axial force is applied to outer clutch 27 through thrust bearing 42 and thrust plate 40.

If gear 26 rotates in a second rotary direction, opposite the first rotary direction, second section 18 of the activation ring moves with respect to control ring 12, second section 18 of the activation ring and control ring 12 become spaced apart and ball ramp 22 expands, while ball ramp 21 remains inactive. When ball ramp 22 expands, an axial force is applied to inner clutch 28 through thrust bearing 43 and thrust plate 41.

Figure 2:
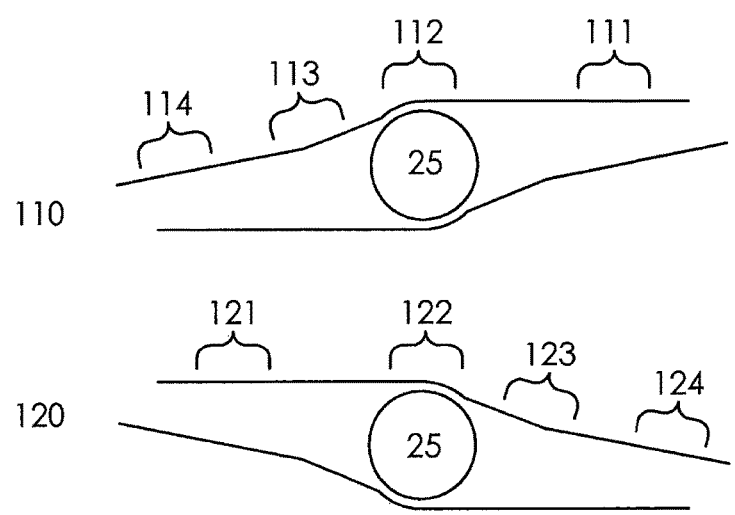
FIG. 2 is a sectional view of ball ramp profiles for one embodiment of the invention.

FIG. 2 is a sectional view of the ball ramp profiles for an embodiment of the invention. As activation ring 13 is rotated, rolling elements 25 are caused to travel in the same rotary direction within their respective grooves or ball ramps 21, 22. The ball ramp profile 110 is for ball ramp 21 provided by the grooves in first section of the activation ring 17 and control ring 12 and ball ramp profile 120 is for ball ramp 22 provided by the grooves in second section 18 of the activation ring and control ring 12.

The ball ramps 110, 120 may have sections with different gradients along the length of the ramp that result in different rates of axial displacement. As shown in FIG. 2, ball ramp profiles 110, 120 can have sections 111, 112, 113, 114, 121, 122, 123, 124.

Sections 111 and 121 of the ball ramps have a low gradient, essentially a zero gradient. In section 111, 121, the ball ramp assembly allows for relative rotation of the inactive clutch without creating axial movement or force. Section 112, 122 has a low gradient, essentially a zero gradient and is directly connected to a section 113, 123 where the gradient of the ball ramp 21, 22 changes. Sections 112, 122 provide a neutral position for the actuator where the axial separation between control ring 12 and activation 13 is at a minimum. Sections 112, 122 allow for actuator controls (not shown) to detect the rolling elements 25 in an idling/neutral position in both ramps prior to further rotation. Sections 113, 123 have a substantially larger gradient than section 112, 122 allowing for rapid axial movement of activation ring 13 which applies a limited load to respective clutches 27, 28. Sections 113, 123 are adjoining to sections 114, 124 which have a relatively shallower gradient compared to sections 113, 123, but a larger gradient than sections 112, 122. Sections 114, 124 allow for further, but slower, axial movement of the section of the activation ring and application of additional load on the respective clutch.

When the ball ramp mechanism is in its neutral position, the rolling elements are in section 112, 122 of the ball ramps. When activation ring 13 rotates in a first rotary direction, rolling elements 25 move into section 113 and section 121 respectively. Section 113 allows the first section 17 of the activation to have rapid axial movement applying a load to clutch 27, while section 121 allows the second section 18 to remain relatively stationary and clutch 28 remains inactive. When activation ring 13 rotates further in the first rotary direction, rolling elements 25 moves into section 114 and further along section 121. In section 114, the gradient of the ramp allows slow axial movement of first section 17 of the activation ring which continues to apply a load to clutch 27 which is a higher load than in applied in section 113 and section 121 allows for the second section 18 of the activation ring to remain stationary.

When activation ring 13 rotates in a secondary rotary direction from the neutral position, rolling elements 25 move into section 123 and section 111 respectively. Section 123 allows the second section 18 of the activation to have rapid axial movement applying a load to clutch 28, while section 111 allows the first section 17 of the activation ring to remain relatively stationary and clutch 27 to remain inactive. When activation ring 13 rotates further in the second rotary direction, rolling elements 25 move into section 124 and further along section 111 respectively. In section 124, the gradient of the ramp allows slow axial movement of second section 18 of the activation ring which continues to apply a load to clutch 28 to apply an overall higher load than in applied in section 123 and section 111 allows the first section 17 of the activation to remain stationary.

Ball ramps 21, 22 are configured in such a manner that the rotation of activation ring 13 in a first rotatory direction causes axial displacement of the first section of activation ring 17 applying a load to outer clutch 27 and rotation of activation ring 13 in a second rotary direction, opposite to said first rotary direction, causes axial displacement of second section 18 of the activation ring applying a load to the inner clutch 28. As such, only one clutch 27, 28 is actuated at a given time and provides for a single actuator to drive two clutches.

The ramp sections are joined together by a radius or other geometry to allow for a smooth transition between sections. The ball ramp profiles 110, 120 of the two different ball ramps 21, 22 can vary to compensate for different clutch diameters or for a different number of clutch plates of the corresponding clutches.

The ball ramp actuator assembly can be inserted into a differential assembly of a motor vehicle where it serves to variably distribute torque between to two side shafts.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. A ball ramp actuator assembly comprising:
a control ring;
an activation ring, wherein the activation ring includes a first section and a second section, wherein the first and second sections are splined together allowing for axial movement;
two circumferential plate grooves, wherein the first groove is formed between the control ring and the first section of the activation ring and the second groove is formed between the control ring and the second section of the activation ring;
a plurality of rolling elements interposed between the control ring and the activation ring in the circumferential plate grooves;
a gear, wherein the gear is drivingly connected to the activation ring;
an actuator, wherein the actuator is drivingly connected to the gear;
a first clutch connected to the first section of the activation ring;
a second clutch connected to the second section of the activation ring;
wherein the first section of the activation ring is arranged to rotate axially when the gear moves in a first rotary direction, allowing the first circumferential plate grooves to expand applying a load to the first clutch and the second section of the activation ring to remain stationary;

wherein the second section of the activation ring is arranged to rotate axially when the gear moves in a second rotary direction, opposite the first rotary direction, allowing the second circumferential plate grooves to expand applying a load to the second clutch and the first section of the activation ring to remain stationary; and wherein the pair of clutches cannot be actuated at the same time.

2. A ball ramp actuator assembly of claim 1, wherein each circumferential plate groove comprises a first section, a second section and third section, wherein each section has a gradient and the gradients of the second and third sections differ to provide different rates of axial displacement of the activation ring, wherein the first section has a gradient different from the second and third sections which allows the rolling element to remain in the first section if there is no rotation of the activation ring, and wherein the first, second and third sections are joined together to form a single continuous groove.

3. The ball ramp actuator assembly of claim 2, wherein each circumferential plate groove further comprises a fourth section, wherein the fourth section of the first groove allows for relative rotation of the first clutch without axial movement of the first section of the activation ring and the fourth section of the second groove allows for relative rotation of the second clutch without axial movement of the second section of the activation ring.

4. The ball ramp actuator assembly of claim 2, wherein the gradient of the second section is steeper than the gradient of the third section or first section.

5. The ball ramp actuator assembly of claim 2, wherein the first section of the grooves provide a neutral position for the assembly wherein the control ring and activation ring are at minimum axial distance from each other.

6. A ball ramp mechanism, comprising:
a control ring;
an activation ring, wherein the activation ring includes a first section and a second section, wherein the first and second sections are splined together allowing for axial movement;
two circumferential plate grooves, wherein a first groove is formed between the control ring and the first section of the activation ring and a second groove is formed between the control ring and the second section of the activation ring;
a plurality of rolling elements interposed between the control ring and the activation ring in the circumferential plate grooves;
wherein the first section of the activation ring is arranged to rotate axially in a first rotary direction while the second section of the activation ring remains stationary; and
wherein the second section of the activation ring is arranged to rotate axially in a second rotary direction, opposite the first rotary direction, and the first section of the activation ring remains stationary;
wherein the first section and second section of the activation ring are axially aligned.

7. The ball ramp mechanism of claim 6, wherein each section of the activation ring has a radial inner surface and a radial outer surface, wherein a plurality of splines are formed on the radial inner surface of the first section and a plurality of splines are formed on the radial outer surface of the second section, and the splines on the first section and the splines on the second section directly engage one another.

8. The ball ramp mechanism of claim 6, wherein each circumferential plate groove comprises a first section, a second section and third section, wherein each section has a gradient and the gradients of the second and third sections differ to provide different rates of axial displacement of the activation ring, wherein the first section has a gradient different from the second and third sections which allows the rolling element to remain in the first section if there is no rotation of the activation ring, and wherein the first, second and third sections are joined together to form a single continuous groove.

9. The ball ramp mechanism of claim 8, wherein each circumferential plate groove further comprises a fourth section, wherein the fourth section of the first groove allows the first section of the activation ring to remain stationary and the fourth section of the second groove allows for the second section of the activation ring to remain stationary.

10. The ball ramp mechanism of claim 8, wherein the gradient of the second section is steeper than the gradient of the third section or first section.

11. The ball ramp mechanism of claim 8, wherein the first section of the grooves provide a neutral position for the ball ramp mechanism wherein the control ring and activation ring are at minimum axial distance from each other.

12. A method of operating a ball ramp actuator to selectively engage one clutch of a two clutch system, comprising the steps of:
providing a ball ramp actuator assembly comprising a gear, an activation ring including a first section and a second section splined together for axial movement, a control ring, two circumferential grooves, one groove formed between the control ring and each section of the activation ring, a first clutch and a second clutch;
rotating the gear in a first rotary direction causing the first section of the activation ring to rotate from a neutral position in a first direction and rolling elements located in the circumferential grooves to move along the circumferential grooves in a first direction expanding a distance between the first section of the activation ring and the control ring applying a load to the first clutch;
returning the first section of the activation ring to the neutral position to remove the load on the first clutch; and
rotating the gear in a second rotary direction, opposite the first rotary direction, causing the second section of the activation ring to rotate from a neutral position in a second rotary direction and the rolling elements to move along the circumferential grooves in a second direction, opposite the first direction, expanding a distance between the second section of the activation ring and the control ring applying a load to the second clutch.

13. The method of claim 12, further comprising the step of further rotating the gear in the first rotary direction, prior to returning the first section of the activation ring to the neutral position, causing the rolling elements to move further along the circumferential grooves in the first direction and to continue to apply the load to the first clutch.

14. The method of claim 12, further comprising the step of further rotating the gear in the second rotary direction, causing the rolling elements to move further along the circumferential grooves in the second direction and to continue to apply the load to the second clutch.

* * * * *